US012331001B2

(12) United States Patent
Wasko

(10) Patent No.: US 12,331,001 B2
(45) Date of Patent: Jun. 17, 2025

(54) PLANT GROWTH MATRIX

(71) Applicant: Christopher Thomas Wasko, Attica, MI (US)

(72) Inventor: Christopher Thomas Wasko, Attica, MI (US)

( * ) Notice: Subject to any disclaimer, the term of this patent is extended or adjusted under 35 U.S.C. 154(b) by 833 days.

(21) Appl. No.: 16/400,604

(22) Filed: May 1, 2019

(65) Prior Publication Data

US 2019/0337865 A1    Nov. 7, 2019

Related U.S. Application Data

(60) Provisional application No. 62/665,391, filed on May 1, 2018.

(51) Int. Cl.
    *C05G 1/00*     (2006.01)
    *A01G 9/02*     (2018.01)
    (Continued)

(52) U.S. Cl.
    CPC .............. *C05G 1/00* (2013.01); *A01G 9/0291* (2018.02); *A01G 24/15* (2018.02); *A01G 24/25* (2018.02);
    (Continued)

(58) Field of Classification Search
    CPC . C05G 1/00; C05F 5/002; C05F 11/08; C05F 11/02; C05F 3/00; C05D 9/00;
    (Continued)

(56) References Cited

U.S. PATENT DOCUMENTS 4,550,527 A     11/1985   Hall et al.
6,073,388 A *   6/2000   Kananen .................. C05D 3/02
                                                                                                                                                             47/1.1
(Continued)

FOREIGN PATENT DOCUMENTS

CN       106665336 A     5/2017
EP         1116434 B1     3/2004
(Continued)

OTHER PUBLICATIONS

International Search Report and Written Opinion of the International Searching Authority, PCT/US2019/030207, dated Aug. 15, 2019, 8 pages.

(Continued)

*Primary Examiner* — Wayne A Langel
(74) *Attorney, Agent, or Firm* — Simonelli IP, PLLC

(57) ABSTRACT

A horticultural growing medium including a support matrix, the support matrix present in an amount between 60 and 80% by weight and an inorganic component. The organic component includes a moss component including at least 50% by weight moss from the *Sphagnum* genus is composed of at least 25% hyaline cells; between 30 and 50% by weight plant derived cellulose fiber component including alone or in any combination: coir, bamboo, hemp, cocoa fiber, rice hulls, and mixtures thereof; and between 0 and 15% cork fiber. The inorganic component includes a particulate igneous volcanic material component including at least one of amorphous volcanic glass, volcanic rock. The horticultural growing medium also includes an organic soil constituent present in an amount between 20 and 40% by weight that includes between 30% and 70% by weight humus soil; between 30% and 70% vermicompost; and up to 5% by weight mammalian derived fecal matter.

17 Claims, 2 Drawing Sheets

(51) Int. Cl.

| | | |
|---|---|---|
| *A01G 9/029* | (2018.01) | |
| *A01G 24/15* | (2018.01) | |
| *A01G 24/25* | (2018.01) | |
| *A01G 24/28* | (2018.01) | |
| *C05D 3/02* | (2006.01) | |
| *C05D 9/00* | (2006.01) | |
| *C05F 3/00* | (2006.01) | |
| *C05F 5/00* | (2006.01) | |
| *C05F 11/02* | (2006.01) | |
| *C05F 11/08* | (2006.01) | |

(52) U.S. Cl.
CPC ............... *A01G 24/28* (2018.02); *C05D 3/02* (2013.01); *C05D 9/00* (2013.01); *C05F 3/00* (2013.01); *C05F 5/002* (2013.01); *C05F 11/02* (2013.01); *C05F 11/08* (2013.01)

(58) Field of Classification Search
CPC ........ C05D 3/02; A01G 9/0291; A01G 24/28; A01G 24/25
See application file for complete search history.

(56) References Cited

U.S. PATENT DOCUMENTS

| | | | | |
|---|---|---|---|---|
| 6,074,988 | A * | 6/2000 | King | C05D 9/00 71/24 |
| 6,408,568 | B1 * | 6/2002 | Kusey | C09K 17/52 47/9 |
| 10,273,193 | B1 * | 4/2019 | Schick | A01G 9/029 |
| 2003/0089152 | A1 * | 5/2003 | Yelanich | A01G 24/00 71/23 |
| 2003/0140556 | A1 * | 7/2003 | Frogley | A01G 24/30 47/63 |
| 2012/0186153 | A1 * | 7/2012 | Bradley | A01G 31/02 47/60 |
| 2016/0122253 | A1 * | 5/2016 | Yoichiro | C05B 17/00 71/24 |
| 2016/0152525 | A1 * | 6/2016 | Chelle | C12N 1/20 71/7 |
| 2016/0219810 | A1 * | 8/2016 | Erkkilä | D21F 11/002 |
| 2017/0000044 | A1 * | 1/2017 | Palmer | A01G 9/0291 |
| 2017/0283337 | A1 * | 10/2017 | Gaunt | C05F 11/08 |
| 2018/0116137 | A1 * | 5/2018 | Gasmer | A01G 24/00 |
| 2018/0325046 | A1 * | 11/2018 | Medhi | A01G 24/22 |
| 2019/0100469 | A1 * | 4/2019 | De La Torre | A01G 24/22 |
| 2020/0229360 | A1 * | 7/2020 | Schoener | A01G 24/10 |

FOREIGN PATENT DOCUMENTS

| | | |
|---|---|---|
| JP | 2016136860 A | 8/2016 |
| WO | 2015/044526 A1 | 4/2015 |

OTHER PUBLICATIONS

Perlite: What It IS and How to Use It Right, Espiritu, Kevin, https://www.epicgardening.com/perlite/, Jun. 9, 2023, as viewed on Oct. 16, 2023.

What Is Peat Moss? Uses in Gardens and Potted Plants, Beaulieu, David, https://www.thespruce.com/how-to-use-peat-moss-5089620, Jan. 20, 2023, as viewed on Oct. 16, 2023.

* cited by examiner

PLANT GROWTH MATRIX

The present application is a non-provisional utility application that claims priority to U.S. Provisional Patent Application Ser. No. 62/665,391 filed May 1, 2018, the specification of which is incorporated by reference in its entirety herein.

BACKGROUND

This disclosure relates to plant growth matrices. More particularly for plant growth media that can be employed in greenhouses and indoor agricultural operations. In certain embodiments the plant growth matrix can be employed in open air agriculture operations.

A wide variety of plant growth media have been proposed for supporting plant growth. Various compositions have been proposed for use as potting soil for house pants, indoor agricultural operations and the like. Some of these compositions have as a base *Sphagnum* moss, peat, soil, ground coconut coir or manures. These materials have various drawbacks including, but not limited to, poor nutrient holding capacity, unpleasant odor and unsuitable water retention. These drawbacks are exacerbated in situations such as indoor greenhouses and other controlled indoor agricultural settings. Thus, it would be desirable to provide a plant growth matrix that could be employed in applications in which attributes such nutrient-holding characteristics and/or suitable water retention characteristics are sought after.

SUMMARY

Disclosed herein are implementations of a horticultural growth medium that includes a support matrix, and an organic soil constituent. In the horticultural growth medium composition as disclosed herein, the support matrix can be present in an amount between 60 and 80% by composition weight.

The support matrix can include an organic component and an inorganic component. The organic plant component can be present in the support matrix in an amount between 40% and 80% by weight of the support matrix. The inorganic component can be present in an amount between 20% and 60% by weight. The organic component can include a moss component and a plant derived cellulose fiber component. In certain embodiments, the moss component is present in an amount between 40 and 70% by weight. The moss component can include at least 50% by weight moss derived from the *Sphagnum* genus and can be composed of at least 25% hyaline cells, with at least 25% of the moss component is present as peat moss. The plant derived cellulose fiber component can be present in an amount between 30 and 50% by organic component weight. Where desired or required, the plant derived cellulose fiber component can be selected from the group consisting of coir, bamboo, hemp, cocoa fiber, rice hulls, and mixtures thereof. Where desired or required, the plant derived cellulose fiber component can include up to 15% by weight cork fiber.

The inorganic component can include a particulate igneous volcanic material component including at least one of amorphous volcanic glass and/or volcanic rock aggregate.

The organic soil constituent can be present in an amount between 20 and 40% by total composition weight and can include between 30% and 70% by weight humus soil; between 30% and 70% vermicompost; and up to 5% by weight mammalian derived fecal matter. The horticultural growing medium has a pH between 6.2 and 7.0.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
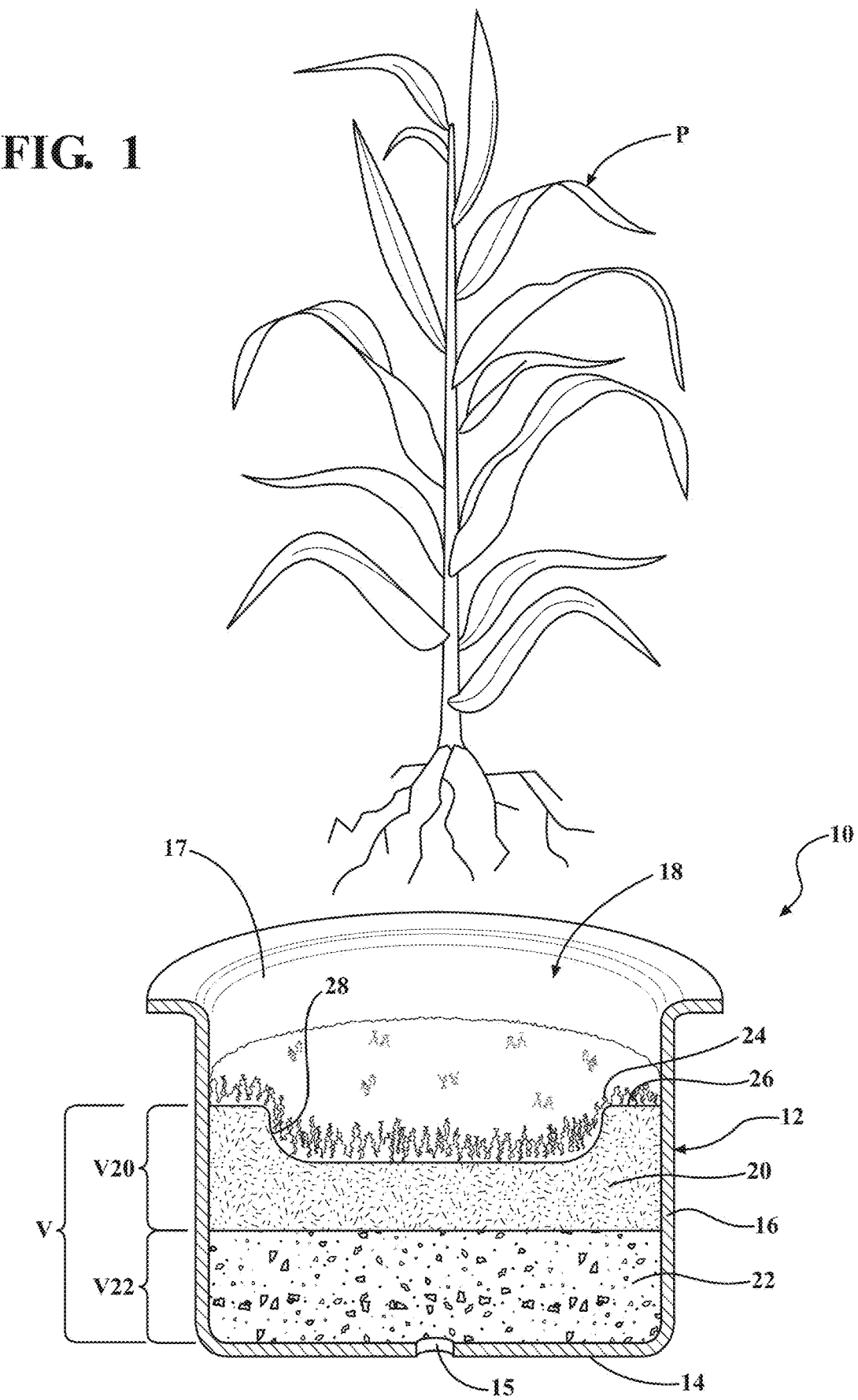
FIG. 1 is cross section of a first embodiment of a planter device as disclosed herein.

The present invention is predicated on the unexpected discovery the sustainable biocompatible horticultural matrix as disclosed herein can promote plant growth that supports plants exhibiting enhanced vigor and/or growth as measured by at least one of: increased root production, increased nutrient uptake, increased fruit or seed production, increased disease resistance, increased height, increased foliage as compared to similar plants cultivated in conventional soil. The sustainable biocompatible horticultural matrix is a horticultural growing medium as disclosed herein that can include a support matrix and an organic matrix. In some embodiments, the sustainable biocompatible horticultural matrix can include optional additives such as plant meal and up to 2% by weight non-mammalian derived bone meal.

In certain embodiments, the support matrix can be present in an amount greater than 50 wt %; greater than 60 wt %. In certain embodiments, the support matrix can be present in an amount between 50 wt % and 85 wt %; between 60 wt % and 85 wt %; between 60 wt % and 80 wt %; between 65 wt % and 80 wt %; between 65 wt % and 75 wt %.; between 70 wt % and 80 wt %.

The support matrix can be a granular material that facilitates and permits development and penetration of growing root portions of an associated seedling or seedlings placed therein. In certain embodiments, the support matrix can be composed of or include a generally granular constituent with have an average particle size up to about 15 mm. It is to be understood that there can be a variation among the size of various particles and/or types of particulate components within the support matrix. The support matrix as disclosed herein has been found, quite unexpectedly to be capable of providing between 250 ppm and 900 ppm free phosphorus. In certain embodiments, the free available phosphorous will be between 200 and 850 ppm, with phosphorus levels between 400 and 800 in certain embodiments.

Without being bound to ant theory, it is believed that the formulation as disclosed herein can provide a horticultural growing medium that can maintain a consistent source of a variety of nutrients sufficient to sustain and promote growth of plant life associated with the horticultural growing medium.

The horticultural growing medium according to certain embodiments as disclosed herein, can have a pH between 6.2 and 7.0 as measured by standard soil testing methods such as the run off test and the slurry test. In certain embodiments, the horticultural growing medium can have a pH of 6.3 to 6.8. In some embodiments, the horticultural growing medium can have a pH between 6.2 and 6.4.

As disclosed herein the horticultural growing medium is composed of a support matrix that can be present in an amount between 50% and 85% by weight of the total weight of the horticultural growing medium in certain embodiments with the balance being composed of a up to 20% by weight of an organic soil constituent. In certain embodiments it is contemplated that the support matrix can constitute between 70 and 80% by weight of the horticultural growing medium as disclosed herein.

The support matrix can include an organic plant-derived component present in an amount between 40% and 80% by weight of the support matrix component. In certain embodiments, the organic plant-derived component can be present in an amount between 50% and 75% by weight of the support matrix. Without being bound by any theory, it is believed that the plant derived component can function to retain water, typically in amounts greater than that the dry weight of the plant-derived component itself. Where desired or required, the plant-derived component can be present as fibers, flakes or the like. In certain embodiments, the plant-derived component can contain and/or take up sufficient moisture to support function of one or more beneficial microbes present in the horticultural growing medium.

In certain embodiments, it is contemplated that the organic plant-derived component can include a sufficient amount of a dry or partially dry plant component that includes hyaline cells. In certain embodiments, the plant component will include at least 25% hyaline cells, which in others it is contemplated that the partially dry plant-derived component will contain greater than 50% hyaline cells. As used herein, the term "hyaline cells" are large non-photosynthetic porous cells that can be dead at maturity and can serve to retain water. And can provide chambers for various invertebrates and microorganisms. Plants useful for such applications can include leaves that have both small, green, living cells (chlorophyllose cells), and large, clear, structural, dead cells (hyaline cells).

In certain embodiments, some or all of the plant-derived component will be a moss material. Where desired or required, the moss material can have a pH between 4.0 and 6.0 as measured by the slurry test. In certain embodiments, the moss can have a pH between 4 and 5.2 As used herein, the term "moss" refers to various mall flowerless, sporophyte-producing plant that typically grow in dense green clumps or mats, often in damp or shady locations. The individual plants are usually composed of simple leaves that are generally only one cell thick, attached to a stem that may be branched or unbranched and has only a limited role in conducting water and nutrients. Although some species have conducting tissues, these are generally poorly developed and structurally different from similar tissue found in vascular plants.

In certain embodiments, the moss material that is employed is one derived from the *Sphagnum* genus. Non-limiting examples of suitable *Sphagnum* mosses include peat mosses. Non-limiting examples of such peat mosses include *Sphagnum* sect. *Acutifolia* such as *Sphagnum fuscum* and *Sphagnum warnstorfii*; *Sphagnum* sect. *Cuspidata* such as *Sphagnum cuspidatum* and *Sphagnum flexuosum*; *Sphagnum* sect. *Sphagnum* such as *phagnum austinii* and *Sphagnum magellanicum*; and *Sphagnum* sect. *Subsecunda* such as *Sphagnum lescurii* and *Sphagnum pylaesii*. Without being bound to any theory, it is believed that moss component of the plant-derived component provides a microbe-supporting scaffolding that supports one or more types of beneficial micro-organisms or one or more colonies of beneficial microorganisms present in the horticultural growing medium as disclosed herein. When used in the horticultural growing medium as disclosed herein the moss-component of the plant-derived component can be inoculated with target microorganisms if desired or required. Non-limiting examples of such microorganism are detailed subsequently. While not being bound by any theory, it is believed that at least a portion of the one or more microorganisms inoculated in the horticultural growing medium infiltrate the hyaline cells and retained therein.

Where desired or required, the moss material can be present as a shredded material having a particle size suitable this remain in admixture in the horticultural growing medium.

The organic plant-derived component also includes at least one plant-derived cellulose fiber component. The plant derived cellulose fiber component selected from the group consisting of coconut, bamboo, hemp, cocoa fiber, rice hulls, and mixtures thereof. The plant-derived fiber component can be resent in an amount between 30 wt % and 50 wt % of the organic plant-derived component. In certain embodiments, the at least one plant-derived component will be present in an amount between 30 and 40% by weight. In certain embodiments the plant-derived cellulose fiber component can be present in the organic plant-derived component in an amount between 40 and 50% by weight where desired or required.

The fibers of the plant-derived cellulose fiber component can have any suitable width and length that will permit integration in the horticultural growing medium as disclosed. The plant-derived cellulose fibers can be present in a dry, semi-dry or undried state. Without being bound to any theory, it is believed that the plant-derived cellulose fiber component can serve to reduce compaction of the organic plant-derived component and the associated support matrix. It is also believed that the plant-derived cellulose fiber component can aid in initial water uptake of the horticultural growing medium in a manner that limits the risk of undue saturation.

In certain embodiments, the plant-derived cellulose fiber component can be composed of fibers that have an average diameter between 0.2 mm and 2 mm, with average diameters between 0.5 and 1 mm in some embodiments. The plant-derived cellulose fibers can have an initial average length between 0.5 cm and at least 40 cm. The plant-derived cellulose fiber component can have an initial average length between 10 and 30 cm in certain embodiments. It is also contemplated that the plant-derived cellulose fibers can have a variety of lengths with the proportion of short fibers, less than 20 cm to long fibers greater than 20 cm is between 2 to 1 and 1 to 2. In certain embodiments, the plant derived cellulose fibers can be composed of cells that can be between 0.5 to 2 mm long and from 5 to 30 mm in diameter. The fibers can have a length in the matric that is between 0.5 and 5 cm.

In certain embodiments, the plant-derived cellulose fiber component will include coir either alone or in combination with other plant-derive cellulose fiber. Where the coir is in combination with other plant-derived cellulose fiber, it is contemplated that the coir material will be present in an amount between 10% and 90% by weight of the cellulose fiber component with the balance being selected from one or more of the following: bamboo, hemp, rice hulls.

Coir fiber as the term is used herein is understood to be a fiber derived at least in part form coconut fiber extracted from the husk of coconut. Coir is the fibrous material found between the hard, internal shell and the outer coat of a coconut. The coir material as used herein can be brown coir (made from ripe coconut and having a layer of lignen deposited on the fiber walls), white coir (fiber derived from unripe coconut) or mixtures of white coir and brown coir. It is believed that at least a portion of the coir fibers have individual fiber cells are narrow and hollow, with thick walls made of cellulose.

In certain embodiments of the horticultural growing medium as disclosed herein, the coir material can be preset as coco peat having an acidity in the range of 5.5 to 7.0 and functions as an absorbent. Where desired or required the at least one plant-derived cellulose fiber component can include at least one of bamboo fibers, hemp fibers, rice hulls and the like. Rice hulls, when employed can be thin, feather-light with the thin, pointed shape of rice grains.

In certain embodiments, the organic plant-derived component can also include up to 15% by weight cork fiber that is derived from phellum layer of bark tissue harvested form plants including but not limited to *Quercus suber*. In certain embodiments, the cork fiber can be present in an amount between 2% and 15% by weight of the organic plant-derived component. In certain embodiments, the organic plant-derived component can present in the organic plant-derived component of the support matrix an amount between 5% and 15% by weight. Where desired or required, where cork is present in the organic-plant-derived component of the support matrix, the amount of the moss component can be reduced by that amount.

Without being bound to any theory, it is believed that the organic plant-derived material employed in the support matrix can be composed of biochemically neutral material. "Biochemically neutral material" as that term is employed herein is defined material that does not yield appreciable nutrients suitable for plant uptake. Without being bound to any theory, it is believed that the organic plant-derived material provides a scaffolding support surface for at least a portion of the beneficial microbial material that are introduced by inoculation into the horticultural growing medium and is discussed subsequently.

Where desired or required, the microbial material can be present as one or more microorganisms that are suitably incubated on the organic plant-derived material prior to integration into the horticultural growing medium. It is also considered with in the purview of this disclosure that the one or more microorganisms can be introduced and integrated in the horticultural growing medium in general and can attach, affix or in some way associate with the organic plant-derived material after admixture. While the organic plant-derived material is considered to be biochemically neutral to the associated plants growing in the horticultural growing medium as disclosed herein, the target microorganisms can interact with the organic plant-derived material in a manner that permits the target microorganisms to derive one or more components suitable for sustaining the metabolic activities of the target microorganisms that are resident on the organic plant-derived material.

The horticultural growing medium as disclosed herein can also include an effective mount of an inorganic component. The inorganic component employed can include one or more compounds that contribute at least one target nutrient to the horticultural growing medium. The inorganic component can also be a particulate aggregate material that is at least partially insoluble in water. The inorganic component can have a bulk density between 0.03 to 150 g/cm$^3$ and 5.5 to 18 g/cm$^3$. The inorganic component can have an average particle size in ranges such as 0 to 4 mm; 0 to 8 mm and the like. It is also contemplated that the average particle size can be in ranges such as 1 to 5 mm and 2 to 8 mm in certain embodiments.

In the horticultural growing medium as disclosed herein the ratio of organic plant-derived component to inorganic component can be between 8:1 and 2:1 plant-derived component to inorganic component respectively. In certain embodiments, the ratio can be between 2:1 and 1:2, while in others, it can be present as a 1:1 ratio. Without being bound to any theory, it is believed that the presence of the inorganic component in the support matrix as disclosed herein can serve as an aeration component that can serve to increase available oxygen to support and promote root propagation. Without being bound to any theory, it is believed that the inorganic component is primarily composed of material that is insoluble or at most semi-soluble in water. In many embodiments, the inorganic component material can be biochemically inert relative to the activity of the organic root derived component of the support matrix. Without being bound to any theory, it is believed that the presence of the inorganic component in the support matrix provides in increased surface area over which water and nutrients can be conveyed such as to the root systems of associated growing plants. It is also contemplated that the presence of the inorganic component in the support matrix can function to convey waste material out of the horticultural growing media where desired or required.

The inorganic component can be present in an amount between 5% and 50% by weight of the support matrix. In certain embodiments, the inorganic component can be present in an amount between 5 and 30% of the support matrix.

Non-limiting examples of suitable compounds include various particulate volcanic solid material that is essentially free of crystalized water. In various embodiments, the particulate volcanic solid material can have a hardness as measures on the MOHS hardness scale between 5 and 6, with harnesses between 5.5 and 6 in certain applications. "Volcanic solid material" as the term is used herein is defined as volcanic rock that is formed from magma erupted from a volcano and can be include hypabyssal and metamorphic rock material.

Non-limiting examples of suitable particulate volcanic material can be an aggregate composed of between 55% to 80% $SiO_2$, between 10% and 20% $Al_2O_3$; between 0.5% and 4% $Fe_2O_3$; between 0.5% and 3% CaO; between 0.5 and 2% $Na_2O$—$K_2O$ and, optionally, minor amounts of $TiO_2$ and/or $SO_3$.

The volcanic rock can include vesicular volcanic rock. In certain embodiments, the vesicular volcanic rock can include pumice, scoria and mixtures thereof. As used herein, the term "pumice" is considered to be a volcanic rock that consists of highly vesicular rough textured volcanic glass, which may or may not contain crystals and can be a highly vesicled glass pyroclastic. "Scoria" a highly vesicular, dark colored volcanic rock that may or may not contain crystals (phenocrysts). It is typically dark in color (generally dark brown, black or purplish red), and basaltic or andesitic in composition. Scoria is relatively low in density as a result of its numerous macroscopic ellipsoidal vesicles, but in contrast to pumice, all scoria has a specific gravity greater than 1, and sinks in water. In certain embodiments the vesicular volcanic rock can be pumice.

The inorganic component of the support matrix can also include suitable particles of amorphous volcanic glass that includes high levels of silicon oxide ($SiO_2$) and may include between 70% and 75% silicon oxide ($SiO_2$); between 12% and 15% aluminum oxide ($Al_2O_3$); between 3% and 4% sodium oxide ($Na_2O$); between 3% and 5% potassium oxide ($K_2O$); between 0.5% and 2% iron oxide ($Fe_2O_3$); between 0.2% and 0.7% magnesium oxide: (MgO); 0.5% and 1.5% calcium oxide (CaO) and between 3-5% loss on ignition of chemical and combined water. Suitable material can have a bulk density between about 0.03 and 0.15 $g/cm^3$. In certain embodiments, the amorphous volcanic glass component can be perlite.

In certain embodiments, it is contemplated that the inorganic component be composed entirely of pumice or can be composed of a mixture of perlite and pumice. Where the inorganic component is present as a ratio of perlite and pumice, it is contemplated that the mixture will be composed of between up to 25% by weight perlite.

The support matrix composition can contain perlite, pumice, moss component and cellulose fiber component in sufficient rations to provide a horticultural growing medium having a water retention value between 100 and 200 gallons per ton; more particularly between 140 and 160 gallons per ton, dry basis and between 50 and 70 gallons per ton, 55 to 65 gallons per ton, 58 to 64 gallons per ton as is soil where the initial moisture content of the as is soil is between 55% and 60% . The support matrix can be composed of equal parts by weight moss component, cellulose fiber component, perlite and pumice in certain embodiments. It is within the purview of the horticultural growing medium as disclosed herein, the support matrix can include between 25% to 50% by weight moss component such as peat moss, between 0 to 25% by weight coir, between 0 and 25% by weight perlite and between 50 and 75% by weight pumice. In certain embodiments, the support matrix can include 10% to 25% by weight perlite with concordant adjustments in the pumice component.

In formulating the support matrix as disclosed herein the respective components can be admixed in a suitable container to provide intimate mixing of the respective support matrix components. Where desired or required, the organic plant-derived component can be inoculated with one or more target microorganisms such as a those discussed subsequently prior to admixture with the other support matrix components and can be optionally exposed to suitable incubation processes to establish individual microorganisms or colonies of microorganisms associated with the organic plant-derived component. Incubation processes can include but are not limited to exposure of the organic plant-derived component to suitable cellular inoculant material while controlling at least one of temperature, humidity gaseous atmosphere or the like for an interval sufficient to establish the association of the target microorganism with the organic plant-derived component.

The horticultural growing medium as disclosed herein also includes an organic soil constituent in intimate admixture with the support matrix. The organic soil constituent as the term is employed herein can include suitable naturally derived materials that can be employed to introduce and/or inoculate the support matrix with one or more target microbes or colonies of microbes beneficial in the horticultural growing medium. The microbes or colonies of microbes can be present in a dormant, semi-dormant or active state when admixture occurs. Without being bound to any theory, it is believed that the one more target microbes, or colonies of target microbes, when introduced into contact with the organic plant-derived component of the support matrix can establish contact with one or more surfaces present on the organic plant-derived component to provide stable microbial colonies. It is also contemplated that the organic soil constituent can include one or more constituents that can support the proper function of one or more of the microbes or colonies of microbes. Non-limiting examples of such constituents include various nutrients either in complex or more elemental form.

It is also considered with in the purview of this disclosure that inoculation can occur in one or more steps with the specific inoculation of the organic plant-derived component with one or more target microbes occurring prior to admixture of the support matrix with the organic soil constituent.

Non-limiting examples of suitable microbes that can be present either the organic soil constituent or employed as a target microorganism in the inoculation of the organic plant-derived component include one or more of the following: *Glomus aggregatum, Glomus etunicatum, Glomus intraradices, Glomus mosseae, Pisolithus tinctorius, Scleroderma cepa, Scleroderma citrinum, Trichoderma harzianum, Trichoderma koningii, Saccharomyces cerevisiae, Azotobacter chroococcum, Bacillus amyloliquefaciens, Bacillus azotoformans, Bacillus coagulans, Bacillus licheniformis, Bacillus megaterium, Bacillus pumilus, Bacillus subtilis, Bacillus thuringiensis, Paenibacillus durum, Paenibacillus polymyxa, Pseudomonas aureofaciens, Pseudomonas fluorescens*. It is also contemplated that one or more of the desired microbes can be introduced in a process that includes both specific inoculation of the organic plant-derived component and admixture of the soil component with the support matrix where desired or required.

The organic soil constituent can be present in the horticultural growing medium in an amount between 20% and 40% by weight. In certain embodiments, it is contemplated that the organic soil constituent can be present in the horticultural growing medium in an amount between 20% and 30% by weight; between 20% and 25% by weight; between 25% and 30% by weight; between 30% and 35% by weight; between 35% and 40% by weight; between 30% and 40% by weight.

The organic soil constituent can comprise a humus constituent, a vermicompost constituent and an optional component derived from fecal matter. In certain embodiments, the organic soil constituent consists essentially of a humus constituent, a vermicompost constituent and an optional component avaian-derived and/or mammalian-derived fecal matter.

The humus constituent employed in the organic soil constituent is a composition that nominates the fraction of soil organic matter that is amorphous and without the cellular cake structure characteristic of plants, micro-organisms or animals. In certain embodiments, the humus constituent is highly complex organic residual matter in soil which is not readily degraded by microorganism, or it is the soft brown/dark colored amorphous substance composed of residual organic matter along with dead microorganisms. The humus constituent can be composed of between 40 and 65% by weight carbon and between 2 and 8% by weight nitrogen with a carbon-to-nitrogen ratio between 10 to 1 and 12 to 1 in certain instances. The humus constituent can also include minor to trace amounts of materials such as humic acid, fulvic acid, humin, apocrenic acid. Humic acid may be present in the humus in an amount between 0 and 0.25%. Fulvic acid may be present in an amount between 0 and 0.25%. In certain embodiments, the humus constituent will be amorphous and will be humified in an amount greater than 80%; great than 90%. The humus can be derived from the surface horizon and/or the subsoil horizon in certain embodiments.

Without being bound to any theory, it is believed that humic acid is a complex mixture of many different acids containing carboxyl and phenolate groups so that the mixture behaves functionally as a dibasic acid or, occasionally, as a tribasic acid. Humic acids can form complexes with ions that are commonly found in the environment creating humic colloids. Humic acids are insoluble in water at acid pH. A typical humic substance is a mixture of many molecules, some of which are based on a motif of aromatic nuclei with phenolic and carboxylic substituents, linked together; the illustration shows a typical structure. The functional groups that contribute most to surface charge and reactivity of humic substances are phenolic and carboxylic groups. Humic acids behave as mixtures of dibasic acids, with a $pK_1$ value around 4 for protonation of carboxyl groups and around 8 for protonation of phenolate groups. There is considerable overall similarity among individual humic acids. The presence of carboxylate and phenolate groups gives the humic acids the ability to form complexes with ions such as $Mg^{2+}$, $Ca^{2+}$, $Fe^{2+}$ and $Fe^{3+}$. Many humic acids have two or more of these groups arranged so as to enable the formation of chelate complexes. The formation of (chelate) complexes is an important aspect of the biological role of humic acids in regulating bioavailability of metal ions.

Fulvic acid has the average chemical formula $C_{135}H_{182}O_{95}N_5S_2$. A hydrogen-to-carbon ratio greater than 1:1 indicates less aromatic character (i.e., fewer benzene rings in the structure), while an oxygen-to-carbon ratio greater than 0.5:1 indicates more acidic character than in other organic fractions of humus (for example, humic acid, the other natural acidic organic polymer that can be extracted from humus). Its structure is best characterized as a loose assembly of aromatic organic polymers with many carboxyl groups (COOH) that release hydrogen ions, resulting in species that have electric charges at various sites on the ion. It is especially reactive with metals, forming strong complexes with $Fe^{3+}$, $Al^{3+}$, and $Cu^{2+}$ in particular, and leading to their increased solubility in natural waters.

The humus soil component can be present as a component of the organic soil constituent of the horticultural growing medium as disclosed herein can contain between 30% and 70% by weight humus soil. In certain embodiments, the organic soil constituent can contain between 40% and 60% by weight humus soil.

Where desired or required, the humus soil of the organic soil constituent can be a colloidal material and can be configured to retain at least 50% of its weight in introduced water and a major portion of the humus constituent is derived from at least one of at least one of surface horizon and/or subsoil.

The organic soil constituent can also include vermicompost in an amount between 30% and 70% by weight of the soil constituent. In certain embodiments, it is contemplated that the vermicompost can be present in an amount between 40% and 60% by weight. As used herein the term "vermicompost" is defined as the product of the composting process using various species of worms, usually red wigglers, white worms, and other earthworms, to create a mixture of decomposing vegetable or food waste, bedding materials, and vermicast.

In certain embodiments, the vermicopost material employed will be vermicast. Vermicast (also called worm castings, worm humus, worm manure, or worm feces) is the end-product of the breakdown of organic matter by earthworms. These castings have been shown to contain reduced levels of contaminants and a higher saturation of nutrients than the organic materials before vermicomposting. The worm castings can be derived from any suitable worm species. In certain embodiments, the castings can be from the red wiggler or tiger worm (*Eisenia fetida* or *Eisenia andrei*); *Lumbricus rubellus* (a.k.a. red earthworm) or European nightcrawlers (*Eisenia hortensis*) or African Nightcrawlers (*Eudrilus eugeniae*) can also be employed.

The organic soil constituent can also optionally include up to 5% by weight avian-derived and/or mammalian-derived fecal matter. In many applications, the mammalian fecal matter is guano such as bat guano containing elevated levels of nitrogen, phosphorous and potassium. In certain embodiments, mammalian-derived fecal matter can be bat guano. Avian-derived guano can be present as seabird guano where desired or required. Without being bound to any theory, it is believed that seabird guano and/or bat guano is composed of nitrogen-rich ammonium nitrate and urate, phosphates, as well as some earth salts and impurities. (Ammonium nitrate is a chemical compound, the nitrate salt of the ammonium cation. It has the chemical formula $NH_4NO_3$, simplified to $N_2H_4O_3$. It is a white crystal solid and is highly soluble in water. It is predominantly used in agriculture as a high-nitrogen fertilizer.). Bat guano is fecal excrement from bats and can be employed in certain embodiments.

In certain embodiments, it is contemplated that that the amount of worm castings present in the horticultural growing medium can be increased to an amount greater than that previously discussed. In certain embodiments the amount of worm castings can be increased by 25%, 50% or 100%. In such instances, the amount of inorganic component, particularly perlite can be decreased.

The horticultural growth medium can also include suitable quantities of plant meal. Without being bound to any theory, it is believed that the plant meal can be present an amount between 0.05% and 7% by weight. Without being bound to any theory, it is believed that the plant meal can provide elevated levels of available compounds including at least one of nitrogen, potassium and various minerals. Non-limiting examples of suitable sources of plant meal sources include kelp meal such as *Heterokona phaeophyceae,* soybean meal such as *Glycine max,* and alfalfa meal such as *Fabaceace medicago*. In certain embodiments, the plant meal component will be composted of approximately equal parts kelp meal, soybean meal, and alfalfa meal.

The horticultural growing composition as disclosed herein can also include up to 2% by weight non-mammalian-derived bone meal compound having a nitrogen-phosphorous-potassium ratio between 3-15-0 and 2-22-0. Without being bound to any theory, it is believed that the bone meal can provide a plant-available source of calcium in the horticultural growing medium. As used herein, the term "bone meal" as employed herein is defined as fish bones and associated material.

The horticultural growing medium of claim 1 further comprising between 0.05% and 3% by weight of a particulate mineral component, the particulate mineral component including at least one of the following: calcium magnesium carbonate, calcium sulfate dihydrate, calcium carbonate, rock dust, diatomaceous earth. Where desired or required, the calcium carbonate can be present in whole or in part in crystal form as calcite, argonite or mixtures thereof. In certain embodiments at least a present as granular limestone. Calcium sulfate dihydrate can be present as a particulate material. Without being bound to any theory, it is believed to be efficacious in ameliorating or attenuating sodium content in the horticultural growing medium. Diatomaceous earth of keiselgur can be present as an oven dried material having a particle size between 10 and 500 micrometers. In certain applications it is believed that the diatomaceous earth material employed will be composed of between 80 to 90% silica with 2 to 4% alumina and trace amounts to 2% iron oxide. Rock dust can be present in the horticultural growing medium and can be composed of one or more of particulate igneous rocks, particulate basalt particulate granite.

It is contemplated that the horticultural growing medium as disclosed can be used as disclosed herein as a plant growth matrix. It is also contemplated that the horticultural growing medium as disclosed herein can be further formulated to produce and amended soil composition. The amended soil composition as disclosed herein can be admixed or introduced to various plant cultivation media to enhance the growth capability of the respective plant cultivation media. In addition to the components previously outlined, the amended soil composition will include between 0.5% and 8% by weight of a particulate mammalian derived microbe support material, the microbe support material being at least one of bone mean, blood meal, with concentrations between 0.5 and 5% by weight being employed in certain embodiments.

The amended soil composition may also contain between 0.05% and 2% by weight of granular material derived from *Medicago sativia* and between 0.5% and 5% by weight of a calcium containing material, the calcium-containing material, the calcium containing material including at least one of: crabmeal, oyster shell, particulate calcium hydroxide.

The amended soil composition will include between 30% and 60% by weight humus soil with the balance of the composition being made up of the horticultural growth medium previously described.

In certain embodiments, the amended soil composition can include powdered chelation regulators present in an amount sufficient to complex with the at least one active on at least one of the group selected from the group consisting of magnesium ions, calcium ions, ferric ions, ferrous ions and mixtures thereof microorganism present in the amended soil composition to catalyze decomposition of at least one soil component concurrent with a plant growth cycle. The chelation regulator employed may be active on at least one of the group selected from the group consisting of magnesium ions, calcium ions, ferric ions, ferrous ions and mixtures thereof. In certain embodiments, the chelation regulator can be selected from the group consisting of humic acid, fluvic acid, salts of humic acid, salts of fluvic acid and mixtures thereof.

In certain embodiments, the amended soil composition between 0.025% and 2% by weight of a zeolite compound, the zeolite compound selected form the group consisting of analcime, chabazite, clinoptilolite, heulandite, natrolite, phillipsite, stilbite and mixtures thereof, with amounts between 0.5 and 1% being employed in certain embodiments.

The amended soil composition as disclosed herein can also include and addition quantity of rock dust in an added amount between 0.05% and 2% by weight as well a as additional quantities of particulate magnesium sulfate in added amount between 0.05% and 2% by weight and between 0.5% and 3% by weight particulate phosphorite.

Where desired or required, the amended soil composition can also include addition quantities of vermicompost in amounts between 5% and 10% by weight and can also include additional amounts of mammalian-derived fecal matter in an amount between 0 and 5% by weight.

Also disclosed in a composite planter unit that can be employed to produce plants exhibiting at least one of elevated growth rates, enhanced vigor, disease resistance, pest resistance, increased flowering, sustained flowering, increased fruit yield, increased root propagation. An embodiment of the composite planter unit as disclosed herein is illustrated in FIGS. 1-3.

Figure 2:
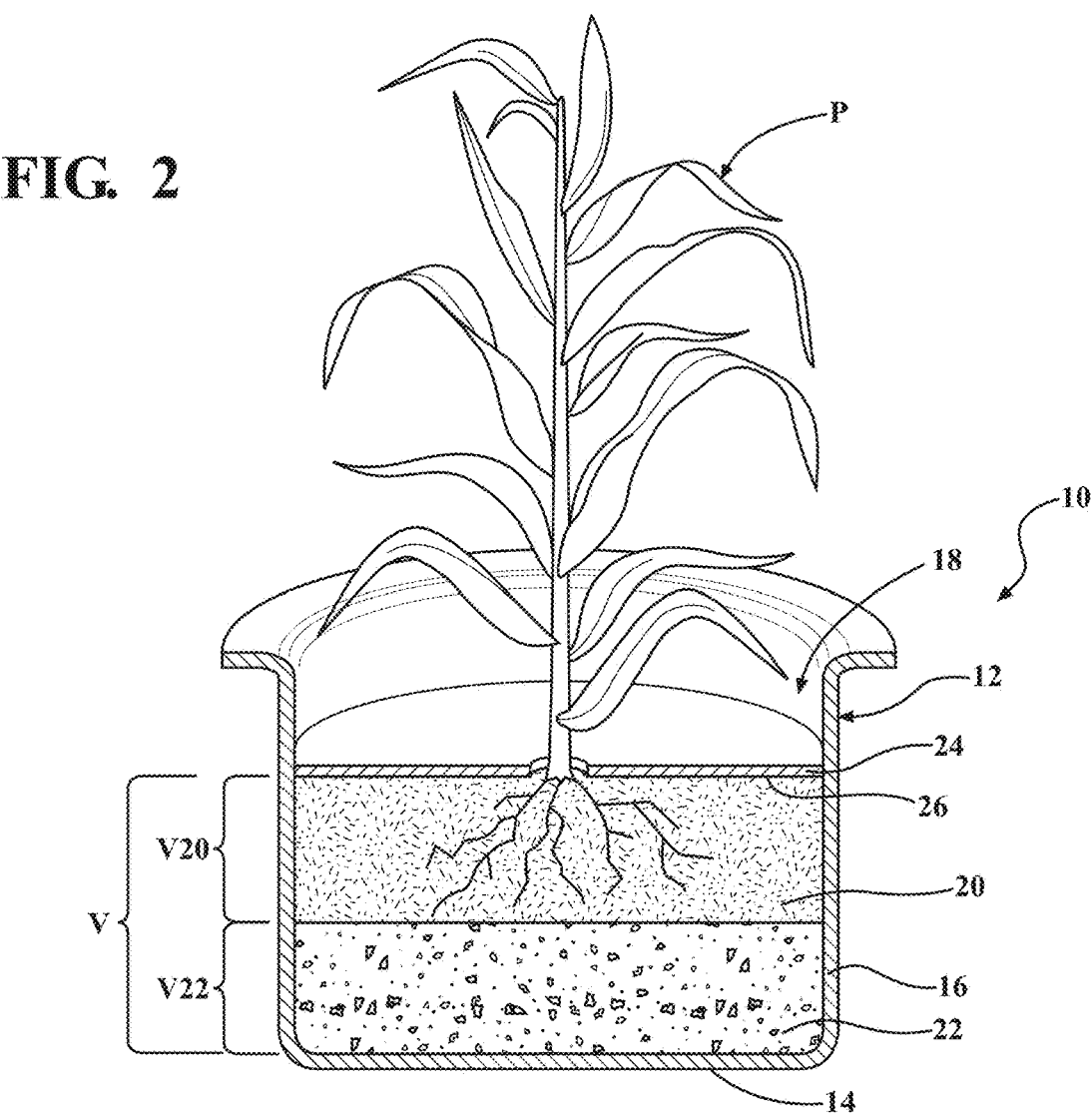
FIG. 2 is cross section of a second embodiment of a planter as disclosed herein.
Figure 3:
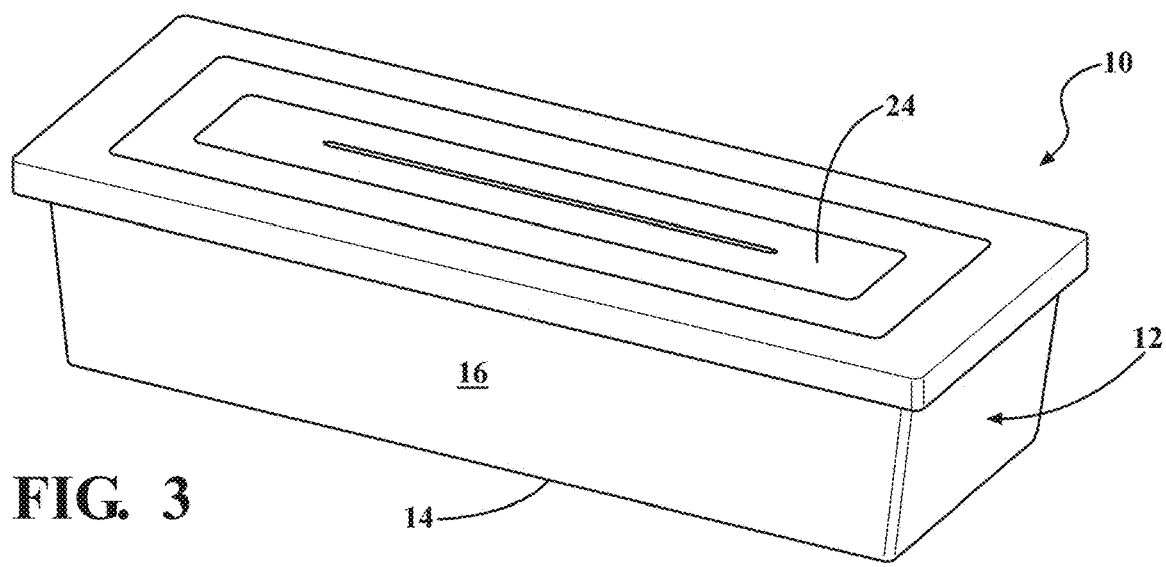
FIG. 3 is a perspective view of an embodiment of a planter device as disclosed herein.

As illustrated in FIGS. 1, 2 and 3, the composite planter unit 10, includes a container 12. The container 12 can be made in whole or in part of biodegradable materials. The container 12 as illustrated as a floor 14 and at least one side wall 16 projecting upward from the floor 14 to define an inner chamber 18. The chamber 18 will have a suitable configuration and an inner volume sufficient to support one or more plants such as plant P. Where desired or required, the composite planter unit 10 can include at least one drain hole 15 defined in either the floor 14 or the at least one side wall 16. In the embodiment depicted the container 12 of composite planter unit 10 has a drain whole 15 defined in the floor 15. The container 12 also has an upper opening 17 opposed to the floor 14. In the embodiment depicted in FIG. 1, the upper opening 17 has dimensions roughly equal to the dimensions defined by the side wall(s) 16.

The composite planter unit 10 can have any suitable geometric configuration. In the embodiment depicted in FIG. 1, the container 12 has a generally cylindrical configuration. In the embodiment depicted in FIGS. 2 and 3, the composite planter unit 10 is rectangular. However other configurations are also contemplated.

The composite planter unit 10 as disclosed includes a first horticultural growing medium 20 configured to support at least a first plant growth stage of plant P. The composite planter unit 10 also includes a second horticultural growing medium 22 adapted to support a second plant growth stage, the second growth stage occurring later than the first growth stage of Plant P.

As illustrated in FIGS. 1 and 2, the second horticultural growing medium 22 is located in the inner chamber 18 proximate to the floor 14 and extend in layered relationship upward therefrom. The first horticultural growing medium 20 is located in the inner chamber 18 at a position distal to the floor 14 and in overlying relationship above the second horticultural growing medium 22.

Together the first horticultural growing medium 20 and the second horticultural growing medium 22 form a growing medium volume V. It is contemplated that the second horticultural growing medium 22 will be present in the inner chamber 18 in a discrete identifiable defined location and will have a volume V22 that equals between 10% and 50% of the growing medium volume in certain embodiments with between 90% and 50% of the total growing medium volume V being the first horticultural growing medium V20.

The horticultural growing medium 20 that is employed in the composite planter unit 10 is broadly defined as the horticultural growing medium as disclosed herein. In certain embodiments, it is contemplated that the horticultural growing medium 20 can comprise a support matrix that is present in an amount between 60 and 80% by weight of the horticultural growing medium and an organic soil constituent present in an amount between 20 and 40% by weight of the horticultural growing medium 20. Where desired or required, the horticultural growing medium 20 can also include between 0.05% and 7% by weight of plant meal containing at least one *Heterokona phaeophyceae, Glycine max;* and *Fabaceace Medicago*. Where desired or required, the horticultural growing medium 20 can also include up to 2% by weight of a non-mammalian-derived bone meal compound having a nitrogen-phosphorous-potassium ratio between 3-15-0 and 2-22-0.

The organic plant-derived component can include between 40 and 70% by weight moss component, between 30 and 50% by weight of at least one plant-derived cellulose fiber component and up to 15% by weight cork fiber. The moss component can include at least 50% by weight moss from the *Sphagnum* genus is composed of at least 25% hyaline cells, wherein at least 25% of the moss component is present as peat moss in certain embodiments. The inorganic component can comprise a particulate volcanic solid material component such as those including at least one of amorphous volcanic glass, volcanic aggregate.

The organic soil constituent can include between 30% and 70% by weight humus soil, between 30% and 70% vermicompost and up to up to 5% by weight avaian-derived and/or mammalian-derived fecal matter.

In certain embodiments, the second horticultural growing medium 22 will be present as a layer that is proximate to the floor 14 of the container 12 with the first horticultural growing medium 20 in overlying relationship thereto. The layer of the second horticultural growing medium 22 can cover the entire surface of the floor 14 or at least a portion thereof in various embodiments.

It is contemplated that at least one plant can be raised from seed or transplanted into the layer containing the first horticultural growing medium layer 20 in container 10 as disclosed herein. Once in place the plant can be raised. The layer 22 can provide root health and direct root growth.

In the embodiment depicted in FIG. 1, the composite planter unit 10 can also optionally include an upper layer 24 overlaying the upper face 26 of first horticultural growing medium layer 20. The upper layer can be continuous or discontinuous and can function to retain the growth medium in place and provide isolation between the growth medium and surrounding environment. In certain embodiments, the upper layer 24 can be configured as biologically derived fiber, synthetic film, organic wax or the like.

The upper face 26 of the upper layer 24 can be configured as generally flat surface or can be configured with at least one indentation such as indentation 28 located to assist in optimum positioning of plant P relative to the first horticultural growing medium layer 20 and second horticultural growing medium layer 22.

In the embodiment depicted in FIGS. 2 and 3, the composite planter unit 10 is depicted as a rectangular unit with upper layer 24 configured as an overlying film or wax having a suitable elongated opening configured to position a plurality of plants P.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A horticultural growing medium comprising;
a support matrix, the support matrix present in an amount between 60 and 80% by weight of the horticultural growing medium, the support matrix comprising:
an organic plant-derived component present in an amount between 40% and 80% by weight of the support matrix, the organic component comprising:
between 40 and 70% by weight moss component, the moss component including at least 50% by weight moss from the *Sphagnum* genus is composed of at least 25% hyaline cells, wherein at least 25% of the moss component is present as peat moss, provided the moss component is less than 25% by weight of the horticultural growing medium;
between 30 and 50% by weight of at least one plant-derived cellulose fiber component, the plant-derived cellulose fiber component selected from the group consisting of coir, bamboo, hemp, cocoa fiber, rice hulls, and mixtures thereof; and
between 1% and 15% by weight cork fiber; and
an inorganic component present in an amount between 10% and 50% by weight of the support matrix, the inorganic component comprising a particulate volcanic solid material component, the particulate volcanic solid material component selected from a group consisting of amorphous volcanic glass and volcanic aggregate;
an organic soil constituent present in an amount between 20 and 40% by weight of the horticultural growing medium, the organic soil constituent comprising:
between 30% and 70% by weight humus soil;
between 30% and 70% vermicompost; and
up to 5% by weight avian-derived and/or mammalian-derived fecal matter;
between 0.05% and 7% by weight of plant meal, the plant meal containing at least one *Heterokona phaeophyceae, Glycine max*; and *Fabaceace medicago;*
up to 2% by weight of a non-mammalian-derived bone meal compound having a nitrogen-phosphorous-potassium ratio between 3-15-0 and 2-22-0,
wherein the horticultural growing medium has a pH between 6.2 and 7.0.

2. The horticultural growing medium of claim 1 further comprising between 0.05% and 3% by weight of a particulate mineral component, the particulate mineral component selected from a group consisting of: calcium magnesium carbonate, calcium sulfate dihydrate, calcium carbonate, rock dust, and diatomaceous earth.

3. The horticultural growing medium of claim 1 wherein the moss component is selected from a group from the *Sphagnum* genus consisting of:
*Sphagnum* sect. *Acutifolia* selected from a group consisting of *Sphagnum fuscum* and *Sphagnum warnstorfii;*
*Sphagnum* sect. *Cuspidata* selected from a group consisting of *Sphagnum cuspidatum* and *Sphagnum flexuosum;*
*Sphagnum* sect. *Sphagnum* selected from a group consisting of *Phagnum austinii* and *Sphagnum magellanicum*; and
*Sphagnum* sect. *Subsecunda.*

4. The horticultural growing medium of claim 1 wherein the inorganic component of the support matrix comprises between 0 and 40% by weight perlite and between 60% and 100% pumice, wherein the inorganic component has an average particle size between 10 micrometers and 750 micrometers.

5. The horticultural growing medium of claim 1 wherein the humus soil of the organic soil is a colloidal material and is configured to retain at least 50% of its weight in introduced water and a major portion of the humus constituent is derived from a group consisting of surface horizon and/or subsoil and wherein the vermicompost is selected from a group consisting of worm castings and worm feces.

6. The horticultural growing medium of claim 1 wherein the support matrix is present in an amount between 65 and 75% by composition weight and the organic soil constituent is present in an amount between 25 and 40% by weight and wherein the moss component is selected from a group from the *Sphagnum* genus consisting of:

*Sphagnum* sect. *Acutifolia* selected from a group consisting of *Sphagnum fuscum* and *Sphagnum warnstorfii*;

*Sphagnum* sect. *Cuspidata* selected from a group consisting of *Sphagnum cuspidatum* and *Sphagnum flexuosum*;

*Sphagnum* sect. *Sphagnum* selected from a group consisting of *Phagnum austinii* and *Sphagnum magellanicum*; and

*Sphagnum* sect. *Subsecunda*.

7. The horticultural growing medium of claim 6 wherein the moss component includes at between 50% and 75% by weight by weight moss from the *Sphagnum* genus is composed of at least 25% hyaline cells, wherein between 25% and 70% by weight of the moss component is present as peat moss and wherein the plant derived cellulose fiber component is coir having an average fiber diameter less than 4 mm and an average fiber length between 0.5 and 5 cm and wherein the horticultural growing medium has a pH between 6.3 and 6.7.

8. The horticultural growing medium of claim 7 including at least one microorganism selected from a group consisting of: *Glomus aggregatum, Glomus etunicatum, Glomus intraradices, Glomus mosseae, Pisolithus tinctorius, Scleroderma cepa, Scleroderma citrinum, Trichoderma harzianum, Trichoderma koningii, Saccharomyces cerevisiae, Azotobacter chroococcum, Bacillus amyloliquefaciens, Bacillus azotoformans, Bacillus coagulans, Bacillus licheniformis, Bacillus megaterium, Bacillus pumilus, Bacillus subtilis, Bacillus thuringiensis, Paenibacillus durum, Paenibacillus polymyxa, Pseudomonas aureofaciens,* and *Pseudomonas fluorescens*.

9. The horticultural growing medium of claim 7 wherein the inorganic component of the support matrix comprises between 0 and 40% by weight perlite and between 60% and 100% pumice, wherein the inorganic component has an average particle size between 1 and 15 mm.

10. The horticultural growth medium of claim 9 wherein the humus soil of the organic soil is a colloidal material and is configured to retain at least 70% of its weight in introduced water the humus constituent is derived from at least one of at least one of surface horizon and/or subsoil and wherein the vermicompost consists is worm castings, with the worm castings present in a humus to wormcasting ratio between 2:1 and 1:2.

11. An amended growth medium comprising in admixed relationship:

between 30% and 60% by weight of the horticultural growth medium of claim 2 and at least one microorganism selected from a group consisting of: *Glomus aggregatum, Glomus etunicatum, Glomus intraradices, Glomus mosseae, Pisolithus tinctorius, Scleroderma cepa, Scleroderma citrinum, Trichoderma harzianum, Trichoderma koningii, Saccharomyces cerevisiae, Azotobacter chroococcum, Bacillus amyloliquefaciens, Bacillus azotoformans, Bacillus coagulans, Bacillus licheniformis, Bacillus megaterium, Bacillus pumilus, Bacillus subtilis, Bacillus thuringiensis, Paenibacillus durum, Paenibacillus polymyxa, Pseudomonas aureofaciens,* and *Pseudomonas fluorescens*;

between 0.5% and 8% by weight of a particulate mammalian derived microbe support material, the microbe support material selected from a group consisting of bone mean and blood meal;

between 0.05% and 2% by weight of granular material derived from *Medicago sativia*;

between 0.5% and 5% by weight of a calcium containing material, the calcium-containing material, the calcium containing material selected from a group consisting of: crabmeal, oyster shell, particulate calcium hydroxide; and between 30% and 60% humus soil.

12. The amended soil composition of claim 11 further comprising:

trace amounts of a powdered chelation regulator, the powdered chelation regulator active on at least one of the group selected from the group consisting of magnesium ions, calcium ions, ferric ions, ferrous ions and mixtures thereof, wherein the powdered chelation regulator is a dibasic acid having at least one phenolic substituent and at least one carboxylic substituent, the chelation regulator selected from the group consisting of humic acid, fluvic acid, salts of humic acid, salts of fluvic acid and mixtures thereof, wherein the chelation regulator is present in an amount sufficient to complex with the at least one microorganism present in the amended soil composition to catalyze decomposition of at least one soil component concurrent with a plant growth cycle.

13. The amended soil composition of claim 10 further comprising;

between 0.05% and 2% by weight of a zeolite compound, the zeolite compound selected from the group consisting of analcime, chabazite, clinoptilolite, heulandite, natrolite, phillipsite, stilbite and mixtures thereof;

between 0.05% and 2% by weight rock dust;

between 0.05% and 2% by weight particulate magnesium sulfate; and between 0.5% and 3% by weight particulate phosphorite.

14. The amended soil composition of claim 10 further comprising;

between 5% and 10% by weight vermicompost; and up to 5% by weight mammalian-derived fecal matter.

15. The amended soil composition of claim 12 further comprising:

trace amounts of a powdered chelation regulator, the powdered chelation regulator active on at least one of the group selected from the group consisting of magnesium ions, calcium ions, ferric ions, ferrous ions and mixtures thereof, wherein the powdered chelation regulator is a dibasic acid having at least one phenolic substituent and at least one carboxylic substituent, the chelation regulator selected form the group consisting of humic acid, fluvic acid, salts of humic acid, salts of fluvic acid and mixtures thereof, wherein the chelation regulator is present in an amount sufficient to complex with the at least one microorganism present in the amended soil composition to catalyze decomposition of at least one soil component concurrent with a plant growth cycle;

between 0.05% and 2% by weight of a zeolite compound, the zeolite compound selected form the group consisting of analcime, chabazite, clinoptilolite, heulandite, natrolite, phillipsite, stilbite and mixtures thereof;

between 0.05% and 2% by weight rock dust;

between 0.05% and 2% by weight particulate magnesium sulfate; and between 0.5% and 3% by weight particulate phosphorite; and between 5% and 10% by weight vermicompost; and up to 5% by weight mammalian-derived fecal matter.

16. A composite planter unit comprising:
a biodegradable container, the biodegradable container having floor and a side wall projecting upward from the floor, the side wall and the floor defining an inner chamber;
a first horticultural growing medium layer configured to support at least a first plant growth stage; and
a second horticultural growing medium adapted to support a second plant growth stage, wherein the second soil region is located in the inner chamber proximate to the floor and the first horticultural growing medium is located above the second horticultural medium layer and wherein the second plant growth stage occurs after the first plant growth stage,
wherein the first horticultural growing medium layer comprises:
a support matrix, the support matrix present in an amount between 60 and 80% by weight, the support matrix comprising:
an organic plant component present in an amount between 40% and 80% by weight of the support matrix, the organic component comprising:
between 40 and 70% by weight moss component, the moss component including at least 50% by weight moss from the *Sphagnum* genus is composed of at least 25% hyaline cells, wherein at least 25% of the moss component is present as peat moss, provided the moss component is less than 25% by weight of the horticultural growing medium;
between 30 and 50% by weight plant derived cellulose fiber component, the plant derived cellulose fiber component selected from the group consisting of coir, bamboo, hemp, cocoa fiber, rice hulls, and mixtures thereof; and
between 0 and 15% cork fiber; and
an inorganic component present in an amount between 20% and 60% by weight of the support matrix, the inorganic component comprising a particulate igneous volcanic material component, the particulate igneous volcanic component including at least one of amorphous volcanic glass, volcanic rock;
an organic soil constituent present in an amount between 20 and 40% by w, the organic soil constituent comprising:
between 30% and 70% by weight humus soil;
between 30% and 70% vermicompost; and
up to 5% by weight mammalian derived fecal matter;
between 0.05% and 7% by weight of plant meal, the plant meal containing at least one *Heterokona phaeophyceae*, and *Glycine max*; and
up to 2% by weight of a mammalian derived bone meal compound having a nitrogen-phosphorous-potassium ratio between 3-15-0 and 2-22-0, wherein the horticultural growing medium has a pH between 6.2 and 6.9.

17. The composite planter unit as set forth in claim 16, wherein the second horticultural growing medium layer comprises:
between 30% and 60% by weight of the horticultural growth medium of claim 16;
between 0.5% and 8% by weight of a particulate mammalian derive microbe support material, the microbe support material being at least one of bone mean, blood meal;
between 0.05% and 2% by weight of granular material derived from *Medicago sativia;*
between 0.5% and 5% by weight of a calcium containing material, the calcium containing material selected form the group consisting of: crabmeal, oyster shell, and particulate calcium hydroxide;
between 30% and 60% humus soil;
between 5% and 10% by weight vermicompost;
up to 5% by weight mammalian derived fecal matter.

* * * * *